(12) United States Patent
Austin et al.

(10) Patent No.: US 6,593,436 B2
(45) Date of Patent: Jul. 15, 2003

(54) CONTINUOUS MANUFACTURE OF SILICONE COPOLYMERS VIA STATIC MIXING PLUG FLOW REACTORS

(75) Inventors: Paul E. Austin, Williamstown, WV (US); Ladislau Heisler, Marietta, OH (US); David B. Davis, St. Marys, WV (US)

(73) Assignee: Crompton Corporation, Middlebury, CT (US)

( * ) Notice: Subject to any disclaimer, the term of this patent is extended or adjusted under 35 U.S.C. 154(b) by 1 day.

(21) Appl. No.: 09/917,080

(22) Filed: Oct. 3, 2001

(65) Prior Publication Data

US 2002/0099137 A1 Jul. 25, 2002

Related U.S. Application Data

(60) Provisional application No. 60/253,962, filed on Nov. 29, 2000.

(51) Int. Cl.$^7$ ................................................ C08G 77/12
(52) U.S. Cl. ................... 525/479; 526/64; 366/341; 366/336; 366/DIG. 1; 366/DIG. 2; 366/DIG. 3; 528/31; 528/32; 556/444; 556/445; 556/446
(58) Field of Search ................... 366/341, 336, 366/DIG. 1, DIG. 2, DIG. 3; 526/64; 528/31, 32; 525/479; 556/444, 445, 446

(56) References Cited

U.S. PATENT DOCUMENTS

| 5,986,022 | A | 11/1999 | Austin et al. |
| 6,015,920 | A | 1/2000 | Schilling et al. |
| 6,448,361 | B1 * | 9/2002 | Austin et al. |

FOREIGN PATENT DOCUMENTS

| DE | 196-32157 A1 | 2/1998 |
| EP | 950680 A1 | 10/1999 |
| EP | 1013701 A2 | 6/2000 |
| EP | 146064 A2 | 10/2001 |

OTHER PUBLICATIONS

Bailey, Jr., F. E. and Critchfield, F. E., A Reaction Sequence Model for Flexible Urethane Foam, American Chemical Society Symposium, (1981), pp. 127–145, Series No., 172, Washington, D.C.

Stevens, Peter J.G., Organosilicone Surfactants as Adjuvants for Agrochemicals, Pesticide Science, (1993), p. 103–122, vol. 38, New Zealand Forest Research Institute, Rotorua, New Zealand.

Fink, Ferdinand; Wernfried, Heilen; Berger, Roland; Adams, Jay, Development of New Additives to Improve Scratch Resistance and Impart Slip to Solvent–Based Coatings Systems, Journal of Coatings Technology, (1990), pp. 47–56, vol. 62, No. 791, Tego Chemie Service USA, Hopewell, VA, U.S.A.

Organosilicon Chemistry, C A Selects Plus, (2000), p. 28, Issue 16.

* cited by examiner

*Primary Examiner*—Robert Dawson
*Assistant Examiner*—Kuo-Liang Peng
(74) *Attorney, Agent, or Firm*—Michael P. Dilworth (57) ABSTRACT

A continuous process for the manufacture of silicone copolymer utilizing at least one static mixing plug flow reactor, and optionally two static mixing plug flow reactors in a series or parallel. Silicone copolymers produced in accordance thereof are substantially free of unreacted hydrogen siloxane starting material and may be used without further purification. The static mixing plug flow reactor contains static mixing elements capable of creating eddies and vortices of sufficient intensity that a biphasic liquid mixture such as a hydrogen siloxane fluid and an polyether olefinic reactant, undergoes shearing of the droplets of each material so that one phase disperses into another to provide intimate contact between the two phases to allow the reaction to proceed.

11 Claims, 1 Drawing Sheet

FIG. 1

CONTINUOUS MANUFACTURE OF SILICONE COPOLYMERS VIA STATIC MIXING PLUG FLOW REACTORS

This application claims priority from U.S. Provisional Patent Application Serial No. 60/253,962 filed on Nov. 29, 2000, which is herein incorporated by reference.

BACKGROUND OF THE INVENTION

1. Field of the Invention

This invention relates in general to a the manufacture of siloxane-oxyalkylene copolymers. The present invention relates to a process for the continuous production of silicone-containing copolymers with polyalkoxy substituent chains, and to the products produced by the process.

2. Description of Related Art

The reaction of hydrosilatable olefins, such as allyl-terminated polyalkyleneoxides with hydrogen siloxanes such as polydimethyl methylhydrogen siloxanes in the presence of an appropriate catalyst to produce silicone copolymers is known. There is interest in finding improved modes of carrying out the hydrosilation reaction. Improvements are elusive because of the variety of byproducts that typically are formed, their properties, and the need to control their formation and to remove those that do form from the desired siloxane copolymer product. In addition, the hydrosilation reaction itself is sensitive to a number of conditions such that it becomes necessary to balance competing effects and to accept non-optimum results.

The efficient manufacture of silicone copolymers via hydrosilation is desired for two primary reasons: 1) lower cost, and 2) less waste. Although the second factor inherently impacts the first, the relative significance on cost may be low; but the impact of waste on the environment, and consequently on the waste-treatment facilities which must be installed to prevent the copolymer from unintentionally reaching the environment, is large. Hence, a method or process of manufacture which is inherently more efficient is of considerable utility. If, in addition, the equipment needed for that method or process is less costly to construct, such method or process will be inherently attractive to manufacturers.

Chemical reactions may be conducted in a batch fashion, in a continuous fashion, or in hybrid fashion (partially batch or partially continuous). For example, the reactants necessary to prepare a silicone-containing copolymer are a silicone methyl hydrogen fluid (hereinafter referred to as a hydrogen siloxane), and an olefinically-terminated polyether or other olefinically terminated compound (hereinafter referred to as an olefinic reactant). The two components are mixed together, in appropriate amounts, with a noble metal catalyst added. A vigorous reaction ensues, and the olefin, by hydrosilation, becomes chemically attached to the silicone.

Traditional batchwise manufacturing operations produce a crude product containing the desired silicone copolymer in a mixture with by-products and one or more reactants. This crude product needs to be treated in order to recover the desired silicone copolymer in a subsequent step. Furthermore, this crude product most likely needs to be stored prior to purification. Storage of the crude product poses a risk of degrading the desired silicone copolymer as well as a risk of the crude product undergoing cross-reaction with potentially hazardous and even explosive effect. Also storing crude product within the manufacturing scheme represents an accumulated inventory of material which raises the overall cost of the process.

The reaction between the raw materials need not be conducted in a purely batch fashion. For example, if the reactivity of the hydrogen siloxane fluid is very high, the olefinic reactant may be charged to the reactor in its entirety, a fraction of the hydrogen siloxane fluid may be charged, the reaction catalyzed by adding a noble metal catalyst solution, and the remaining hydrogen siloxane fluid added subsequently and at such a rate, after the initial reaction exotherm has begun to subside, to keep the reaction under control. This process is sometimes called semi-batch, or (incorrectly) semi-continuous. If both the hydrogen siloxane fluid and the polyether or olefin are added only in part initially, and then all components added continuously after the reaction initiated, and added until the reactor were full, this fashion of reaction would be called (correctly) semi-continuous.

Inherently, continuous systems are much smaller than batch reactor systems, and are thus less costly. But more importantly from an operating perspective, they contain much less product, and are thus much easier to clean. Thus, less waste is generated, if cleaning is implemented between two different products, and less material is lost from equipment "holdup", so overall efficiency is higher. From an operating perspective, they are also more "controllable", in the sense that the extent or degree of reaction is primarily determined by the reactor or equipment design, as opposed to a batch reactor system, wherein the extent or degree of reaction is primarily determined by elapsed time, which factor can be enormously influenced by a multitude of variables such as purity of raw materials, temperature, material of construction, and others.

There are, in a general sense, two types of continuous reactors which are conceptually suitable for copolymer formation: continuous stirred tank reactors (CSTRs); and plug-flow reactors. A CSTR is simply a tank, usually vigorously agitated, into which the reactants and catalysts—all the components of a batch reaction—are fed continuously, and product is withdrawn continuously and at the same total rate as reactants are added. It is inherent, however, in this type of reactor, that not all of any of the reactants can be completely consumed. Because the system is vigorously agitated, fresh reactants, just momentarily previously introduced into the system, have a finite probability of exiting the reactor by withdrawal of the contents, along with old reactants which have spent much longer time in the tank—i.e., they have reacted, and, hence, have become crude product. A silicone-containing copolymer containing unreacted hydrogen siloxane fluid is well known in the art to be totally unsuitable for making certain polyurethane foams; for example, it collapses flexible/slab-stock foam.

In the simplest version of a plug-flow reactor, all reactants are introduced into the front end of a pipe of sufficient length to ensure reaction completion. The pipe is usually maintained at the temperature of reaction, and reaction ensues along the length of the pipe. The length of the pipe is determined by the time necessary to cause the reaction to proceed to completion—i.e., at least one of the reactants has been completely consumed. The above described problem of unreacted hydrogen siloxane fluid exiting a CSTR reactor might be circumvented by the use of a plug flow reactor, were it not that without continued mixing, an immiscible hydrogen siloxane fluid and olefinic reactant will phase-separate very rapidly subsequent to initial mixing, thus causing reaction to proceed more and more slowly. In fact, the reaction ceases rapidly without ongoing agitation, and then fails to proceed, even upon renewed agitation, which effect is believed to be caused by gradual, irreversible deactivation of the noble metal catalyst.

Thus, neither of the two standard continuous reactor systems alone are effective for manufacture of silicone-polyether copolymers, or any other silicone-containing copolymer for which the reactants are immiscible.

U.S. Pat. No. 5,986,022 to Austin, et al. which issued on Nov. 16, 1999, and assigned to the assignee of the present invention, is directed to the reaction of hydrogen siloxane fluids with polyalkyleneoxides in the presence of platinum catalyst in a continuous fashion employing stirred tank reactors in combination with plug flow reactors. Multiple reactors are required prior to the use of a non-agitated plug flow reactor, otherwise phase separation of the reactants is likely to occur and will cause potential performance problems in the product. And although potentially beneficial, slightly different molecular weight distributions of copolymer products are obtained using this method when compared to batchwise processing.

U.S. Pat. No. 6,015,920 to Schilling, et al. which issued on Jan. 18, 2000, and assigned to the assignee of the present invention, discloses hydrosilation process between olefins and hydrosilanes or hydrosiloxanes wherein a portion of the reactor output is recycled continuously to the reactor. However, one drawback of this process is that an excess of one of the reactants requires continuous removal from the crude product for recycle back to the reactor.

Thus, it would be beneficial to develop a process for the continuous manufacture of silicone copolymer without any of the aforementioned drawbacks of the prior art.

Bearing in mind the problems and deficiencies of the prior art, it is therefore an object of the present invention to provide a method of continuous manufacture of silicone copolymer wherein the reactants do not undergo phase separation.

It is another object of the present invention to provide a method of continuous manufacture of silicone copolymer wherein the crude product may be readily usable without further purification.

A further object of the invention is to provide an apparatus for the continuous manufacture of silicone copolymer.

It is yet another object of the present invention to provide a silicone copolymer made by a continuous process which does not require further purification and is substantially-free of hydrogen siloxane starting material.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method of making silicone copolymers comprising the steps of: providing one or more static mixing plug flow reactors; continuously feeding reactants to one or more static mixing plug flow reactors, the reactants comprising hydrogen siloxane, at least one olefinic reactant capable of reacting with the hydrogen siloxane, and catalyst; and continuously withdrawing from a terminal end of one or more static mixing plug flow reactors a product stream substantially free of unreacted hydrogen siloxane.

In a second aspect, the present invention is directed to an apparatus for continuous manufacture of silicone copolymers comprising one or more plug flow reactors having a static mixing element adapted to create turbulence of such intensity that a biphasic liquid mixture undergoes shearing of droplets sufficient to disperse one phase into another, an inlet means for introduction of reactants into said one or more plug flow reactors, and an outlet means for removal or reaction products from one or more plug flow reactors.

In a third aspect, the present invention is directed to a silicone copolymer manufactured by feeding at least one hydrogen siloxane, at least one olefinic reactant capable of reacting with the at least one hydrogen siloxane, and a catalyst into one or more static mixing plug flow reactors having a static mixing element adapted to create turbulence of such intensity that a biphasic liquid mixture such as the at least one hydrogen siloxane and the at least one olefinic reactant undergo shearing of droplets sufficient to disperse one phase into another; allowing the at least one hydrogen siloxane, the at least one olefinic reactant capable of reacting with the at least one hydrogen siloxane, and the catalyst to reside in the one or more static mixing plug flow reactors such that substantially complete hydrosilation is effectuated; and continuously withdrawing the silicone copolymer, the silicone copolymer being substantially free of unreacted hydrogen siloxane.

In a fourth aspect, the present invention is directed to a polyurethane foam produced by the reaction of: a polyol; polyisocyanate prepolymer; a catalyst; an optional auxiliary blowing agent; and a silicone copolymer produced by feeding at least one hydrogen siloxane, at least one olefinic reactant capable of reacting with the at least one hydrogen siloxane, and a catalyst into one or more static mixing plug flow reactors having a static mixing element adapted to create turbulence of such intensity that a biphasic liquid mixture such as the at least one hydrogen siloxane and the at least one olefinic reactant undergo shearing of droplets sufficient to disperse one phase into another, allowing the at least one hydrogen siloxane, the at least one olefinic reactant capable of reacting with the at least one hydrogen siloxane, and the catalyst to reside in the one or more static mixing plug flow reactors such that substantially complete hydrosilation is effectuated, and continuously withdrawing the silicone copolymer, the silicone copolymer being substantially free of unreacted hydrogen siloxane.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIG. 1 of the drawings in which like numerals refer to like features of the invention. Features of the invention are not necessarily shown to scale in the drawings.

The present invention is directed to the continuous manufacture of silicone copolymers, a reactor system for the continuous manufacture of silicone copolymers, and the resultant silicone copolymer which has surprising advantages over silicone copolymers made by prior art batch or continuous processes.

Silicone copolymers of the present invention are the product of a hydrosilation reaction, typically catalyzed with a noble metal, between a hydrogen siloxane and an olefinic reactant. In accordance with the present invention, the reactants are continuously fed into one or more plug flow reactors having a static mixing means wherein the product that is continuously withdrawn is substantially free of unreacted hydrogen siloxane.

The plug flow reactors used in the present invention have static mixing means which create sufficient turbulent flow such that the flow of liquid across the static mixing elements creates eddies and vortices of sufficient intensity that a biphasic liquid mixture comprising the hydrogen siloxane and the olefinic reactant, undergoes shearing of the droplets of each phase sufficient to disperse one phase into the other. Separation of the biphasic liquid mixtures into the two distinct phases does not occur faster than two to three half lives of the hydrosilation reaction. Thus, intimate contact between the hydrogen siloxane and the olefinic reactant is assured for a sufficient time to allow the reaction to proceed to about 75 to 85% completion.

Not all static mixing means are capable of creating the turbulent flow required. For example, a static mixing element which simply "folds over" the flow will readily mix two miscible liquids, but may not disperse two immiscible liquids sufficiently that the hydrosilation reaction proceeds to the point of compatibilization of the reactants. To determine whether a static mixer element is appropriate will depend on four factors: 1) rate of flow of the liquid mixture; 2) length of mixer element; 3) relative miscibility of the hydrogen siloxane and olefinic reactant; and 4) intensity of droplet shear impacted by the static mixer element design and configuration.

In consideration of the factors, a high rate of flow using a simple "fold-over" design static mixer element may suffice, whereas a low flow would not sufficiently break down droplet size to allow sufficient reaction to prevent phase separation. Likewise, the same "fold-over" design, repeated multiple times, may cause sufficient homogenization to effect phase compatibilization, whereas a single element results in phase separation. Again, the "fold-over" design may suffice to homogenize the biphasic reaction medium and result in compatibilization if the two phases are already close to miscible, whereas two very immiscible siloxane and olefinic reactant would remain as two distinct phases. Furthermore, the remaining factor, static mixer element design and configuration, may play an important role. By creating more eddies and vortices per unit length, inadequacies in the first three factors may be overcome.

No general formula may be given to predict which static mixer element design will be most effective, or what length reactor must be used, or at what flow rates. However, one of skill in the art may consider the following general guidelines: hydrogen siloxanes containing lesser amounts of active hydrogen to be hydrosilated with more polar olefinic reactants, require maximum turbulence—i.e., high flow rate, longer length, and best static mixer efficacy. Olefinic reactants such as polyethers which are least compatible with hydrogen siloxanes have low molecular weight, are uncapped, and/or have higher ethylene oxide composition. These least compatible siloxane/polyether mixtures will require greatest length of the reactor, highest flow rate, and/or most intense mixing. In general, olefinic reactants, other than polyethers, which tend to compatibilize the reaction mixture, will diminish the need for greater length, higher flow rate, or more turbulence.

The residence time within the static mixing plug flow reactor will depend somewhat on the particular reactants and on the desired rate of throughput. For some reactions, formation of the desired silicone copolymer proceeds at an adequate rate that short residence times are sufficient. In other reactions, longer residence times will be needed. This can be controlled by the velocity or rate at which the raw materials are introduced into the unit, by the length of the unit, and/or the design and configuration of the static mixing elements.

Figure 1:
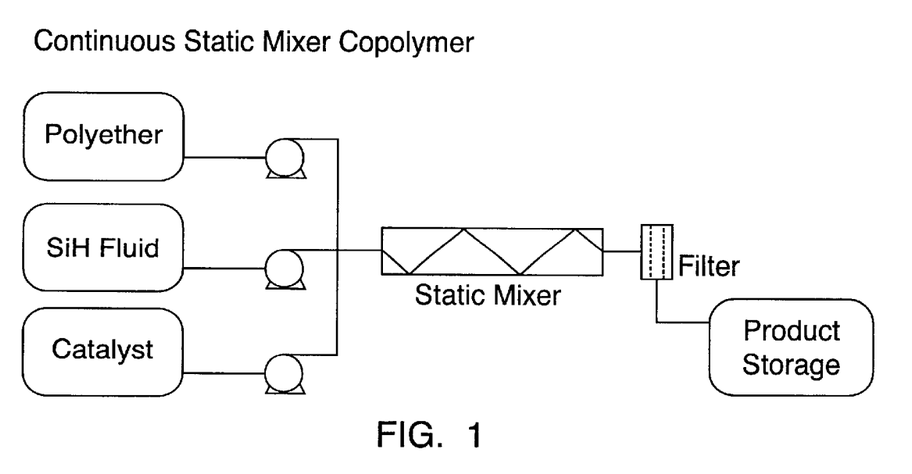
FIG. 1 is a schematic representation of a static mixing plug flow reactor system of the present invention.

FIG. 1 illustrates a representative schematic design for the continuous manufacture of silicone copolymer in accordance with the present invention. A static mixing plug flow reactor 10 has an internal static mixing means 15. Reactor 10 is of a length that the reactants have sufficient residence time so that substantially complete hydrosilation is effectuated between the hydrogen siloxane starting material and the olefinic reactant. Internal static mixing means 15 is designed and configured such that the flow of liquids across the static elements causes sufficient agitation of such intensity that the two phases of the hydrogen siloxane and the olefinic reactant do not readily separate.

Inlet means 20 allows for introduction of the starting materials necessary to manufacture a silicone copolymer of the present invention. Inlet means 20 may be connected to a storage tank for the olefinic reactant 25, a tank for the hydrogen siloxane 30, and a tank for the catalyst 35. At steady state, the reactants are continuously fed into reactor 10 via inlet means 20. The catalyst may be fed continuously initially, or optionally intermittently along the length of reactor 10. The level of catalyst is added to take the entire contents to the desired concentration of catalyst and thereafter, catalyst addition is made to maintain that concentration.

Preferably, the total amount of the olefinic reactant fed into reactor 10 is in a stoichiometric excess of the hydrogen siloxane as it is imperative that the silicone copolymer product contain no more than a trace amount, less than 0.1 wt. %, of unreacted hydrogen siloxane. Preferably, no unreacted hydrogen siloxane is present at all.

As the reactants are introduced into static mixing plug flow reactor 10, the static mixing means 15 creates eddies and vortices of sufficient intensity that a biphasic liquid mixture comprising the hydrogen siloxane and the olefinic reactant, undergoes shearing of the droplets sufficient to disperse one phase into the other such that separation does not occur within reactor 10. The hydrogen siloxane and olefinic reactant are in intimate contact for a period of time to allow the reaction to proceed to completion.

After catalyst addition from storage tank 35, an exotherm is observed in reactor 10. The temperature of the reactants is maintained at about 45° to 135° C. as it traverses the length of the reactor. As the reaction progresses along the length of reactor 10, substantially complete hydrosilation is effectuated. The reaction must proceed in the reactor to such an extent that the product stream exiting reactor 10 via outlet means 40 is homogeneous and substantially complete. Surprisingly, the required degree of homogeneity is achieved with the static mixing plug flow reactor system of the present invention in spite of the notoriously incompatible nature of the hydrogen siloxane and olefinic reactants without suffering the phase separation expected of such materials. The point at which the reaction mixture reaches homogeneity corresponds to about 60 to 65% conversion of the hydrogen siloxane to silicone copolymer and is referred to as the "clear point". The reaction mixture becomes clear as phase compatibilization is achieved since the silicone copolymer is compatible with both types of raw materials.

Once reactor 10 is full, the silicone copolymer product which is substantially free of unreacted hydrogen siloxane is continuously withdrawn from outlet means 40. An apparatus 45 to remove any solvents used, unreacted olefinic reactants, or reaction by-products may be positioned between outlet means 40 and a storage tank 50 for collecting the silicone copolymer product. The silicone copolymer product may be used without further purification.

The length of reactor 10 may be adjusted according to the specific needs of the products made and to obtain phase compatibilization by vigorous turbulent internal agitation via static mixing means 15 to allow for a complete reaction. The need for a second static mixer or a longer unit will be apparent if a sample of the reaction mixture exiting reactor 10 shows evidence of phase separation such as the development of two distinct phases, or upon centrifugation to remove air bubbles, the sample remains hazy, a sign of incomplete reaction. Preferably, the present invention is carried out using one or more, and optionally two or more, static mixing plug flow reactors of sufficient length, diameter and static mixing means to afford sufficient residence time. When two or more static mixing plug flow reactors are used, they may be situated in series or parallel to one another.

Additional olefinic reactants may be added subsequently to the initial influx of reactants. A subsequent olefinic reactant may be added to reactor 10 at any given pre-set interval along the length of the reactor. In the initial reaction, a limiting amount of the first olefinic reactant is added which reacts with the hydrogen siloxane to a uniform degree of completion. With the addition of another and subsequent olefinic reactant along a later section of the reactor, the new olefinic reactant again reacts uniformly with the compatibilized phase resulting from reaction between the hydrogen siloxane and the first olefinic reactant. Likewise, a subsequent and different hydrogen siloxane fluid may be introduced into the reactor in a similar staged fashion. In fact, any combination of reactants may be added in a staged fashion to reproducibly manufacture customized silicone copolymers.

Hydrogen siloxanes which would be useful in the present invention may be any organohydrogensiloxane comprising any combination of siloxane units selected from the group consisting of $R_3SiO_{1/2}$, $R_2HSiO_{1/2}$, $R_2SiO_{2/2}$, $RHSiO_{2/2}$, $RSiO_{3/2}$, and $HSiO_{3/2}$, provided that the hydrogen siloxane contains sufficient R-containing siloxane units to provide an average of from 1 to 3.0 R radicals per silicon atom and sufficient H-containing siloxane units to provide from 0.01 to 1 silicon-bonded hydrogen atoms per silicon atom and a total of R radicals and silicon-bonded hydrogen atoms of from 1.5 to 3.0 per silicon atom.

Each R group is independently the same or different and each represents a hydrocarbon radical. Illustrative of suitable R radicals are alkyl radicals having from 1 to 12 carbon atoms such as methyl, ethyl, propyl, butyl, and decyl, cycloaliphatic radicals containing 5 to 12 carbon atoms such as cyclohexyl and cyclooctyl, and aryl radicals such as phenyl optionally substituted with 1 to 5 alkyl groups of up to 6 carbon atoms, such as tolyl and xylyl. The preferred R radical is methyl.

The hydrogen siloxanes used in the current invention are typically fluids with a hydrogen content of about 5 cc/gm to about 334 cc/gm. The viscosities of the fluids may range from less than 1 cstk (centistoke) to greater than 300 cstk, as long as appropriate pumps are used. The structures of these fluids range from pure monomer such as 1,1,2,2 tetramethyldisiloxane, to polymeric equilibrated fluid having a structure of $MD_{150}D'_{10}M$ wherein M is $R_3SiO_{1/2}$, D is $R_2SiO_{2/2}$, and D' is $HRSiO_{2/2}$. Dimethylhydrogensiloxy endblocked structures may also be used to prepare linear block copolymers sometimes referred to as $(AB)_n$ structures. There appears to be no limit to the structure of the hydrogen siloxane other than that imposed by practicality and handling aspects and the desired properties of the resultant copolymer product.

The olefinic reactant with which the process of this invention is carried out may be any that reacts with a hydrosilane or hydrosiloxane in the desired reaction. The olefinic reactants contemplated include not only unsaturated hydrocarbons, but also any compound which has an ethylenic or acetylinic unsaturation which may be hydrosilated, including, but not limited to, acetylene, and allyl started materials. Preferred examples of the olefinic reactant are allyl chloride and methallyl chloride. Other olefinic reactants useful in this reaction include, but are not limited to,: 1-octene, 1-hexene, amylene, 1-octadecene, allyl glycidyl ether, vinylcyclohexene monoxide, allyl(meth)acrylate, perfluorooctylethylene, and acrylonitrile. Additional examples of the olefinic reactants are terminally unsaturated polyalkyleneoxides with a terminal group such as allyl or methallyl and a chain of repeating ethylene oxide and/or propylene oxide units.

Preferred terminally unsaturated polyalkyleneoxide reactants correspond to the formula:

$$R^1(OCH_2CH_2)_v(OCH_2CH(CH_3))_w-OR^2$$

it being understood that the polyalkyleneoxide moiety may be a block or random copolymer of ethoxy and propoxy units, and is typically a blend of molecules of varying chain lengths and compositions. $R^1$ denotes an alkenyl group containing 3 to 10 carbon atoms and is preferably an allyl or methallyl group. $R^2$ is preferably hydrogen, but may be an alkyl group having 1 to 5 carbon atoms, an acyl group having 2 to 5 carbon atoms, an allyl group, a methallyl group or a trialkylsilyl group. The subscript v has a value of 0 to 50 and the subscript w has a value of 0 to 50, provided that the sum of v and w is greater than 0.

Structures of the olefinically unsaturated polyether reactant include polyalkyleneoxide mono allyl ether, all ethylene oxide, mixtures of ethylene oxide and propylene oxide, or all propylene oxide. The molecular weight range of these olefinically unsaturated polyethers may be of nominal molecular weight of about 204 Daltons up to about 4000 Daltons or greater. Whether the polyether is capped (e.g., a methyl, allyl ether) or uncapped (a mono allyl ether) is immaterial. It is preferred that an appropriate buffering agent be present, especially if the polyether is uncapped.

Additional olefinic reactants may also be added to the reaction mixture. If added, it may be of any standard structure. For example, ethylene is sometimes used with an allyl-polyether to improve compatibility as a polyurethane foam surfactant; vinylcyclohexenemonoxide may be used as a co-reactant with allyl-polyether to form a terpolymer used in textile softening; and Eugenol and a polyether may be used with a hydrogen siloxane fluid to produce a common diesel fuel antifoam copolymer. A branched chain olefin, alone, may be used with a hydrogen siloxane fluid to produce a polyurethane foam surfactant.

Preferably, the raw materials are purified as is known by one of skill in the art.

Although no solvent is needed, small amounts of solvent to compatibilize the raw materials may be added without compromising the effectiveness of the process. However, if solvent is added, a solvent stripping system may be required in the reactor system or the solvent would remain in the copolymer product.

The hydrosilation reaction between the hydrogen siloxane and the olefinic reactant is conducted in the presence of a noble metal hydrosilation catalyst. Such catalysts are well known and include platinum, palladium and rhodium-containing compounds. In general, platinum catalysts are preferred. Chloroplatinic acid and the platinum complexes of 1,3-divinyltetramethyldisiloxane are particularly preferred.

The catalyst is employed in an effective amount sufficient to initiate, sustain and complete the hydrosilation reaction. The amount of catalyst is usually within the range of from about 1 to about 100 parts per million (ppm) noble metal based on the total parts of the mixture of reactants and solvent. Catalyst concentrations of about 5 to about 50 ppm are preferred.

The hydrosilation reaction may be optionally conducted in the presence of additives (or "buffering" agents) such as the carboxylic acid salts which prevent the dehydrocondensation of hydroxyl groups with the SiH moiety on the hydrogen siloxane. This technology is effective at preventing unwanted side reactions during the hydrosilation of uncapped polyethers such as allylpolyethyleneoxide glycol. The use of such "buffering" agents in the present invention will provide the same results as in a batch process. Preferably, the salt must be predissolved in the polyether, prior to introduction into the static mixing plug flow reactor. The steady-state concentration of the buffering agents used in the static mixing plug flow reactor should be equivalent to that used in a batch process.

Optionally, the hydrosilation reaction of the present invention may be carried out in the presence of the sterically hindered nitrogen or the phosphate salts. Depending on the method of manufacture, and on the nature of the reactants, one or more of these additives may be present during the hydrosilation reaction. For example, a low, but sometimes adequate, level of carboxylic acid salts or phosphate salts may already be present in olefinically substituted polyoxyalkylenes due to inadvertent exposure to traces of oxygen during subsequent capping of hydroxyl groups with allylic, methallylic, methyl or acyl groups, or due to neutralization of basic catalysts with phosphoric acid. In such instances, the intentional use of the salt or other additive may not be necessary.

Whereas the scope of the present invention is set forth in the appended claims, the following specific examples illustrate certain aspects of the present invention and, more particularly, point out methods of evaluating the same. It is to be understood, therefore, that the examples are set forth for illustration only and are not to be construed as limitations on the present invention. All parts and percentages are by weight unless otherwise specified.

The following test procedures were used to evaluate the products obtained in the examples.

Foam Test

Unless otherwise indicated in the Examples, the polyurethane foams were prepared according to the general procedure described in F. E. Bailey, Jr. and F. E. Critchfield, A Reaction Sequence Model for Flexible Urethane Foam, American Chemical Society Symposium, (1981), pp. 127–145, Series No., 172. The basic steps in the procedures for mixing and foaming of blown polyurethane foam on a laboratory scale are:

1. The formulation ingredients are weighed and made ready to be added in the predetermined sequence to the mixing container.
2. The formulation ingredients (with the exception of polyisocyanate) are mixed intensively, and allowed to "degas" for a prescribed time; an auxiliary blowing agent, other than water, may be added (if such auxiliary agent is used) prior to mixing.
3. Polyisocyanate is added and the formulation is mixed again. The mixed formulation is poured quickly into an open-topped container such as an open-topped disposable plastic pail for slab foam or a uniformly heated tube for rigid foams, and the foam is allowed to rise.
4. After the rise is complete, the foam is allowed to stand from the time the mixing procedure began for a total of 3 minutes, and is then post-cured in an oven at 115° C. for 15 minutes. Foam Cell uniformity (Table II, ST) is judged by the structure of the foam where a "1" rating has small uniform cell structure and a "14" has large non-uniform coarse cell structure. Foams were evaluated in duplicate and values average. Urethane foam Air Flow (Table II, AF) are obtained utilizing a NOPCO instrument on a horizontal ½ inch (1.27 cm) thick cut of foam obtained 3 inches from the bottom of the foam bun. The Porosity of the foam is measure in $ft^3$/min of air flow through the ½ inch (1.27 cm) thick cut of foam.

Cloud Point

Cloud point is a measurement of water solubility and as used herein is the temperature at which a silicone polyether, for example, begins to precipitate out of a 1% copolymer/99% water solution. The higher the cloud point the more prolonged (as temperature increases) the water solubility.

Cloud Point was determined as follows: A 1.0 gram sample was dissolved in 99 ml of distilled water in a 150 ml beaker. A 1 inch (2.54 cm) plastic coated stirrer bar was inserted in the beaker, and the beaker was placed on a combination stirrer/hot plate. A 0 to 100° C. thermometer was suspended in the solution with the bulb ½ inch (1.27 cm) from the bottom of the beaker. With mild stirring, the contents of the beaker were heated at the rate of 1 to 2° C. per minute. The temperature at which the submerged portion of the thermometer was no longer visible was recorded.

Viscosity

Viscosity was determined at 25° C., using a calibrated Ostwald viscometer that gives an efflux time of approximately 100 seconds. The measurements are repeated until the efflux time readings agree within 0.1 seconds. Calculations are determined by the equation: E×F=Viscosity (cstk), where E=Efflux time (sec); F=Calibration factor.

Static Mixing Plug Flow Reactor Apparatus

The static mixing plug flow reactor consists of 20 feet PFA tubing (⅜" OD, ¼" ID) packed with 20 feet of polyacetal in-line mixers (¼" OD), coiled and immersed in a constant temperature bath. The equilibrated methyl hydrogen polysiloxane fluid is continuously fed with a pump from a reservoir into the static mixing plug flow reactor, via PFA tubing, a one-way check valve and a branch tee. The olefinic reactant is mixed in a reservoir with the chloroplatinic acid catalyst (3.3% solution in ethanol) and the catalyst buffer (if required) just prior to commencement of operation, and then continuously fed with a pump into the statically-mixed plug flow reactor, via PFA tubing, a one-way check valve and a branch tee. The final product is continuously collected in a receiver.

In this experimental set-up, the temperature is controlled by the constant temperature bath. The stoichiometry and the residence time are controlled by the flow rates for the two components, the equilibrated methyl hydrogen polysiloxane and the olefinic reactant.

With the in-line mixers the mixing takes place around the centerline and in the direction of flow. The two pumps push the two components into the mixer via the branched tee. The stream of partially miscible liquids is then mixed by the in-line mixer and forced to the opposite outside walls. A vortex is created along the tubing's centerline axis, vortex that is sheared and the process recurs with the opposite rotation. This clockwise/counterclockwise motion mixes the liquids to ensure adequate dispersion and reaction to afford a homogeneous end product.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

EXAMPLES

Examples 1–9 are comparative examples in which the method of preparation utilizes a batch hydrosilation process. Examples 10–16 below, demonstrate the production of copolymers employing a continuous hydrosilation process utilizing two continuous stirred reactors (CSTR) followed by a non-agitated plug flow reactor in series as taught in U.S. Pat. No. 5,986,022. Examples 17–25 below, demonstrate the production of copolymers employing a continuous hydrosilation process utilizing a static mixing plug flow reactor in accordance to the present invention.

Example 1 (batch), Example 10 (CSTR) and Example 17 (statically-mixed) utilizes the same raw materials in the same stoichiometric ratios. The olefinically substituted polyether is methyl terminated consisting of all polyethyleneoxide. This material is used in agricultural applications.

Example 2 (batch), Example 11 (CSTR) and Example 18 (statically-mixed) utilizes the same raw materials in the same stoichiometric ratios. The olefinically substituted polyether is butyl terminated consisting of all polypropyleneoxide. This material is used in surface leveling paint and coatings applications.

Example 3 (batch), Example 12 (CSTR) and Example 19 (statically-mixed) utilizes the same raw materials in the same stoichiometric ratios. The olefinically substituted polyethers are hydroxy terminated consisting of randomly mixed polyethyleneoxide/polypropyleneoxide. These products can be used in surface leveling paint and coatings applications and in flexible polyurethane foam formulations when closed celled foam is desirable.

Example 4 (batch), Example 13 (CSTR) and Example 20 (statically-mixed) utilizes the same raw materials in the same stoichiometric ratios. The olefinically substituted polyether is hydroxy terminated consisting of randomly mixed polyethyleneoxide/polypropyleneoxide. These products may be used in rigid polyurethane foam formulations in which good uniform closed cell structure is important.

Example 5 (batch), Example 14 (CSTR) and Example 21 (statically-mixed) utilizes the same raw materials in the same stoichiometric ratios. The olefinically substituted polyether is acetoxy terminated consisting of randomly mixed polyethyleneoxide/polypropyleneoxide. These products can be used in rigid polyurethane foam formulations in which good uniform closed cell structure is important.

Example 6 (batch), Example 15 (CSTR) and Example 22 (statically-mixed) utilizes the same raw materials in the same stoichiometric ratios. The olefinically substituted polyethers are acetoxy terminated consisting of randomly mixed polyethyleneoxide/polypropyleneoxide. These products can be used in flexible polyurethane foam formulations in which good uniform cell structure and resilient foam properties are important.

Example 7 (batch), Example 16 (CSTR) and Example 23 (statically-mixed) utilizes the same raw materials in the same stoichiometric ratios. The olefinically substituted polyethers are acetoxy terminated consisting of randomly mixed polyethyleneoxide/polypropyleneoxide. These products can be used in flexible polyurethane foam formulations in which good uniform cell structure and resilient foam properties are important.

Example 8 (batch), and Example 24 (statically-mixed) utilizes the same raw materials in the same stoichiometric ratios. The olefinically substituted material is allyl glycidyl ether. The silanic fluid is an example of an SiH terminated silicone fluid derived from an M' fluid. These products can be used in preparing personal care products.

Example 9 (batch) and Example 25 (statically-mixed) utilizes the same raw materials in the same stoichiometric ratios. The olefinically substituted material is 1-octene. These products can be used in agricultural applications as an oil soluble spreading agent.

List of Materials and Abbreviations $M=(CH_3)_3SiO_{1/2}$  $M'=(CH_3)_2(H)SiO_{1/2}$
$D=(CH_3)_2SiO$  $D'=(CH_3)(H)SiO$ 40HA1500-OAc=acetoxy capped allyl started random polyether with 40 wt. % ethylene oxide (EO)/60 wt. %propylene oxide (PO); Molecular Weight (MW)=1500 Daltons.

40HA4000-OAc=acetoxy capped allyl started random polyether with 40 wt. % EO/60 wt. % PO; MW=4000 Daltons.

40HA1500-OH=hydroxy terminated allyl started random polyether with 40 wt. % EO/60 wt. % PO; MW=1500 Daltons.

40HA4000-OH=hydroxy terminated allyl started random polyether with 40 wt. % EO/60 wt. % PO; MW=4000 Daltons.

100HA350-OMe=methyl capped allyl started polyether with 100 wt. % EO; MW=350 Daltons.

100HA350-OH=hydroxy capped allyl started polyether with 100 wt. % EO; MW=350 Daltons.

75HA750-OH=hydroxy capped allyl started random polyether with 75 wt. % EO/25 wt. % PO; MW=750 Daltons.

75HA750-OAc=acetoxy capped allyl started random polyether with 75 wt. % EO/25 wt. % PO; MW=750 Daltons.

100LA800-OBu=butyl capped allyl started polyether with 100 wt. % PO; MW=800 Daltons.

Example 1 (Comparative)

To a 4-necked, 500 ml round bottom flask, equipped with a stirrer, Friedrich condenser, a temperature-controller and a sparge tube, the following materials were charged: 196.4 grams of 100HA350-OMe. The flask contents were agitated and heated to 95° C. reaction temperature with a slight nitrogen sparge. Once the reaction mixture reached 95° C., heating and nitrogen sparge were discontinued. The reaction was catalyzed with 0.24 ml of 3.3% chloroplatinic acid solution in ethanol (10 ppm Pt) and 53.9 grams of equilibrated methylhydrogen polysiloxane fluid having a nominal structure of, $MD_{1.8}M$ was charged to the flask over a 1 hr period. Within 120 minutes the reaction exothermed and the flask temperature peaked at 105° C. This reaction product was filtered through a 5 micron filter pad under pressure to afford a clear haze-free product of 50 cstk with a cloud point of 55° C. and a refractive index of 1.4490. No residual hydrogen siloxane was detected in the product.

Example 2 (Comparative)

To a 4-necked, 1000 ml round bottom flask, equipped with a stirrer, Friedrich condenser, a temperature-controller and a sparge tube, the following materials were charged: 408 grams of 100LA800-OBu, 91.9 grams of equilibrated methyl hydrogen polysiloxane fluid having a nominal structure of $MD_7D'_3M$. The flask contents were agitated and heated to 95° C. with a slight nitrogen purge. Once the reaction mixture reached 95° C., heating was discontinued. The reaction was catalyzed with 0.50 ml of 3.3% chloroplatinic acid solution in ethanol (10 ppm Pt). Within 1 minute the reaction exothermed and the flask temperature peaked at 130° C. The reaction pot was cooled to 95° C. and agitated an additional 30 minutes. This reaction product was cooled to room temperature and filtered through a 5 micron filter pad under pressure to afford a clear haze-free product of 139 cstk. No residual hydrogen siloxane was detected in the product.

Example 3 (Comparative)

To a 4-necked, 1000 ml round bottom flask, equipped with a stirrer, Friedrich condenser, a temperature-controller and a sparge tube the following materials were charged: 172.5 grams of 40HA1500-OH, 194.5 grams of 40HA4000-OH, 0.05 grams of sodium propionate, and 133 grams of equilibrated methyl hydrogen polysiloxane fluid having a nominal structure of $MD_{70}D'_5M$. The flask contents were agitated and heated to 95° C. with a slight nitrogen purge. Once the reaction mixture reached 95° C., heating was discontinued, and the reaction was catalyzed with 0.48 ml of 3.3% chloroplatinic acid solution in ethanol (10 ppm Pt). Within 5 minutes the reaction exothermed and the flask temperature peaked at 110° C. The reaction pot was cooled to 95° C. and agitated an additional 30 minutes. This reaction product was cooled to room temperature and filtered through a 5 micron filter pad under pressure to afford a clear haze-free product of 4132 cstk and a cloud point of 36.8° C. No residual hydrogen siloxane was detected in the product.

Example 4 (Comparative)

To a 4-necked, 1000 ml round bottom flask, equipped with a stirrer, Friedrich condenser, a temperature-controller and a sparge tube the following materials were charged: 338 grams of 75HA750-OH, 162 grams of equilibrated methyl hydrogen polysiloxane fluid having a nominal structure of $MD_{47}D'_7M$, and 0.1 gram of 2-(dibutylamino)ethanol. The flask contents were agitated and heated to 95° C. with a slight nitrogen purge. Once the reaction mixture reached 95° C., heating was discontinued, and the reaction catalyzed with 0.48 mL of 3.3% chloroplatinic acid solution in ethanol (10 ppm Pt). Within 5 minutes the reaction exothermed and the flask temperature peaked at 117° C. The reaction pot was cooled to 95° C. and agitated an additional 35 minutes. This reaction product cooled to room temperature was filtered through a 5 micron filter pad under pressure to afford a clear haze-free product of 683 cstk and a cloud point of 54.8° C. No residual hydrogen siloxane was detected in the product.

Example 5 (Comparative)

To a 4-necked, 1000 ml round bottom flask, equipped with a stirrer, Friedrich condenser, a temperature-controller and a sparge tube the following materials were charged: 345 grams of 75HA750-OAc, 155.2 grams of equilibrated methyl hydrogen polysiloxane fluid having a nominal structure of $MD_{47}D'_7M$, and 0.15 gram of 2-(dibutylamino)ethanol. The flask contents were agitated and heated to 95° C. with a slight nitrogen purge. Once the reaction mixture reached 95° C., heating was discontinued. The reaction was catalyzed with 0.48 mL of 3.3% chloroplatinic acid solution in ethanol (10 ppm Pt). Within 5 minutes the reaction exothermed and the flask temperature peaked at 116° C. The reaction pot was cooled to 95° C. and agitated an additional 35 minutes. This reaction product cooled to room temperature was filtered through a 5 micron filter pad under pressure to afford a clear haze-free product of 461 cstk and a cloud point of 41.5° C. No residual hydrogen siloxane was detected in the product.

Example 6 (Comparative)

To a 4-necked, 1000 ml round bottom flask, equipped with a stirrer, Friedrich condenser, a temperature-controller and a sparge tube the following materials were charged: 140.6 grams of 40HA1500-OAc, 227.5 grams of 40HA4000-OAc, 132.0 grams of equilibrated methyl hydrogen polysiloxane fluid having a nominal structure of $MD_{70}D'_5M$, and 0.2 grams of tributylamine. The flask contents were agitated and heated to 90° C. with a slight nitrogen purge. Once the reaction mixture reached 90° C., heating was discontinued, and the reaction was catalyzed with 0.47 ml of 3.3% chloroplatinic acid solution in ethanol (10 ppm Pt). Within 5 minutes the reaction exothermed and the flask temperature peaked at 111° C. The reaction pot was cooled to 90° C. and agitated an additional 30 minutes. The reaction was cooled to room temperature and filtered through a 5 micron filter pad under pressure to afford a clear haze-free product of 3807 cstk and a cloud point of 34.0° C. No residual hydrogen siloxane was detected in the product.

Example 7 (Comparative)

To a 4-necked, 1000 ml round bottom flask, equipped with a stirrer, Friedrich condenser, a temperature-controller and a sparge tube the following materials were charged: 201 grams of 40HA1500-OAc, 201 grams of 40HA4000-OAc, 98 grams of equilibrated methyl hydrogen polysiloxane fluid having a nominal structure of $MD_{65}D'_7M$, and 0.3 grams of tributylamine. The flask contents were agitated and heated to 90° C. with a slight nitrogen purge. Once the reaction mixture reached 90° C., heating was discontinued and the reaction was catalyzed with 0.47 ml of 3.3% chloroplatinic acid solution in ethanol (10 ppm Pt). Within 5 minutes the reaction exothermed and the flask temperature peaked at 109° C. The reaction pot was cooled to 90° C. and agitated an additional 38 minutes. The reaction product was cooled to room temperature and filtered through a 5 micron filter pad under pressure to afford a clear haze-free product of 2144 cstk and a cloud point of 34.0° C. No residual hydrogen siloxane was detected in the product.

Example 8 (Comparative)

To a 4-necked, 250 ml round bottom flask, equipped with a magnetic stirrer, Friedrich condenser, a temperature-controller and a sparge tube the following materials were charged: 7.1 grams of allyl glycidyl ether, 142.9 grams of equilibrated methyl hydrogen polysiloxane fluid having a nominal structure of $M'D_{100}M'$. The flask contents were agitated and heated to 90° C. with a slight nitrogen sparge. Once the reaction mixture reached 90° C. temperature, heating and nitrogen sparge were discontinued and the reaction was catalyzed with 0.08 ml of 3.3% chloroplatinic acid solution in ethanol (5 ppm Pt). Within 10 minutes the reaction exothermed and the flask temperature peaked at 102° C. This reaction product was filtered through a 5 micron filter pad under pressure to afford a clear haze-free product of 111 cstk. No residual hydrogen siloxane was detected in the product.

Example 9 (Comparative)

To a 4-necked, 250 ml round bottom flask, equipped with a magnetic stirrer, Friedrich condenser, a temperature-controller and a sparge tube the following materials were charged: 5.3 grams of 1-octene, 96.4 grams of equilibrated methyl hydrogen polysiloxane fluid having a nominal structure of MD'M. The flask contents were agitated and heated to 60° C. with a slight nitrogen sparge. Once the reaction mixture reached 60° C. temperature, heating and nitrogen sparge were discontinued and the reaction was catalyzed with 0.09 mL of 3.3% chloroplatinic acid solution in ethanol (6 ppm Pt). Within 10 minutes the reaction exothermed and the flask temperature peaked at 120° C. The reaction temperature was allowed to drop to 70° C. and an additional 48.3 grams of 1-octene was added dropwise to the reaction flask to maintain a reaction temperature between 60 and 80° C. Following the complete addition of the 1-octene, the flask was stirred at 80° C. for 30 minutes. This reaction product was cooled to 25° C. and was filtered through a 5 micron filter pad under pressure to afford a clear haze-free product of 2.39 cstk. No residual hydrogen siloxane was detected in the product.

Example 10 (Comparative)

In a steady state operation, 1571 grams/hour of 100HA350-OMe (same lot of material used in Example #1) was fed into a first continuous stirred tank reactor (CSTR) and 431.4 grams/hour of equilibrated methyl hydrogen polysiloxane fluid having a nominal structure of $MD'_{1.8}M$ (same lot as used in Example #1) was fed into the first continuous stirred reactor apparatus as described in U.S. Pat. No. 5,986,022. The temperature of the 100HA350-OMe glycol and methyl hydrogen polysiloxane mixture held into the first CSTR was 95–100° C. The agitated reaction in the first CSTR was catalyzed continuously with a 3.3% chloroplatinic acid solution in ethanol at a rate of 2.0 ml/hour that afforded a constant concentration of 10 ppm of platinum in the first CSTR. Because of the continuous hydrosilation reaction exotherm, the CSTR was maintained at a constant temperature range of 95–100° C. by use of an external jacket on the first CSTR. The reaction mixture was pumped out of the first CSTR at the same rate at which it entered the first CSTR (2002.4 grams/hour) through an insulated pipeline and into a second CSTR. The temperature in the second CSTR was maintained at 95–100° C. by the use of an external heated jacket on the second CSTR. The reaction mixture left the second stirred reactor at a temperature of 95–100° C. as a homogeneous clear liquid at a rate of 2002.4 grams/hour and entered the plug flow reactor. The heating of the plug flow reactor was controlled so that the reaction mixture maintained a temperature of at least 95° C. The average residence time in the combined volume of the three reactors was 3.0 hours. The resulting product was cooled to <50° C. and filtered through a 5 micron filter pad under pressure to afford a clear haze-free product of 49.9 cstk, with a cloud point of 55° C. and a refractive index of 1.4500. No residual hydrogen siloxane starting material was detected in the product.

Example 11 (Comparative)

In a steady state operation, 1632 grams/hour of 100LA800-OBu (same lot of material as in Example #2) was fed into a first CSTR and 367.5 grams/hour of an equilibrated methyl hydrogen polysiloxane fluid having a nominal structure of $MD_7D'_3M$ (same lot as in Example #2) was fed into the first continuous stirred reactor apparatus. The temperature of the 100LA800-OBu glycol and methyl hydrogen polysiloxane mixture was 95–100° C. in the first CSTR. The agitated reaction in the first CSTR was catalyzed continuously with a 3.3% chloroplatinic acid solution in ethanol at a rate of 1.5 ml/hour that afforded a constant concentration of 7.5 ppm of platinum in the first CSTR. Because of the continuous hydrosilation reaction exotherm, the CSTR was maintained at a constant temperature range of 95–100° C. by the use of an external jacket on the first CSTR. The reaction mixture was pumped out of the first CSTR at the same rate at which it entered the first CSTR (approximately 2000 grams/hour) through an insulated pipeline and into a second CSTR. The temperature in the second CSTR was maintained at 95–100° C. by the use of an external heated jacket on the second CSTR. The reaction mixture left the second stirred reactor with a temperature of 95–100° C. as a homogeneous clear liquid at a rate of 2000 grams/hour and entered the plug flow reactor. The heating of the plug flow reactor was controlled so that the reaction mixture maintained a temperature of at least 95° C. The average residence time in the combined volume of the three reactors was 3.0 hours. The resulting product was cooled to <50° C. and filtered through a 5 micron filter pad under pressure to afford a clear haze-free product of 129 cstk. No residual hydrogen siloxane was detected in the product.

Example 12 (Comparative)

In a steady state operation, 1459 grams/hour of 40HA1500-OH/40HA4000-OH glycol blend (same lot and weight ratio of materials as in Example #3) containing 0.01 wt. % sodium propionate was fed into a first CSTR and 541.2 grams/hour of equilibrated methyl hydrogen polysiloxane fluid having a nominal structure of $MD_{70}D'_5M$ (same lot as in Example #3) was fed into the first CSTR. The temperature of the 40HA1500-OH/40HA4000-OH glycol blend and methyl hydrogen polysiloxane held in the first CSTR was maintained at 95–100° C. The agitated reaction in the first CSTR was catalyzed continuously with a 3.3% chloroplatinic acid solution in ethanol at a rate of 2.0 ml/hour that afforded a constant concentration of 10 ppm of platinum in the first CSTR. Because of the continuous hydrosilation reaction exotherm, the CSTR was maintained at a constant temperature range of 95–101° C. by the use of an external jacket on the first CSTR. The reaction mixture was pumped out of the first CSTR at the same rate at which it entered the first CSTR, approximately 2001 grams/hour, through an insulated pipeline and into a second CSTR. The temperature in the second CSTR was maintained at 95–102° C. by the use of an external heated jacket on the second CSTR. The reaction mixture left the second stirred reactor at a temperature of 95–102° C. as a hazy liquid at a rate of 2001 grams/hour and entered the plug flow reactor. The heating of the plug flow reactor was controlled so that the reaction mixture maintained a temperature of at least 105–109° C. The average residence time in the combined volume of the three reactors was 3.0 hours. The resulting product was cooled to <50° C. and was filtered through a 5 micron filter pad under pressure to afford a hazy product of 4281 cstk and a cloud point of 37.5° C. Residual hydrogen siloxane was detected at a level of 0.4 cc $H_2$/ gram of product. This reaction did not go to full completion.

Example 13 (Comparative)

In a steady state operation, 1352 grams/hour of 75HA750-OH glycol (same lot of material as in Example #4) was fed into a first CSTR and 648 grams/hour of equilibrated methyl hydrogen polysiloxane fluid having a nominal structure of $MD_{47}D'_7M$, and 0.03 gram/hour of 2-(dibutylamino)ethanol (same lots as in Example #4) was fed into the CSTR. The temperature of the 75HA750-OH glycol and methyl hydrogen polysiloxane held in the first CSTR was maintained at 95–100° C. The agitated reaction in the first CSTR was catalyzed continuously with a 3.3% chloroplatinic acid solution in ethanol at a rate of 2.0 ml/hour that afforded a constant concentration of 10 ppm of platinum in the first CSTR. Because of the continuous hydrosilation reaction exotherm, the CSTR was maintained at a constant temperature range of 95–100° C. by the use of an external jacket on the first CSTR. The reaction mixture was pumped out of the first CSTR at the same rate at which it entered the first CSTR (approximately 2000 grams/hour) through an insulated pipeline and into a second CSTR. The temperature in the second CSTR was maintained at 93–100° C. by the use of an external heated jacket on the second CSTR. The reaction mixture left the second stirred reactor with a temperature of 93–100° C. as a homogeneous clear golden color liquid at a rate of approximately 2000 grams/hour and entered the plug flow reactor. The heating of the plug flow reactor was controlled so that the reaction mixture maintained a minimum temperature of at least 95° C. The average residence time in the combined volume of the three reactors was 3.0 hours. The resulting product was cooled to <50° C. and was filtered through a 5 micron filter pad under pressure to afford a clear haze-free product of 741 cstk and a cloud point of 59.6° C. Residual hydrogen siloxane was detected at a level of 0.1 cc $H_2$/gram of product.

Example 14 (Comparative)

In a steady state operation, 1379.3 grams/hour of 75HA750-OAc glycol (same lot of material as in Example #5) was fed into a first CSTR and 620.7 grams/hour of equilibrated methyl hydrogen polysiloxane fluid having a nominal structure of $MD_{47}D'_7M$, and 0.03 gram/hour of 2-(dibutylamino)ethanol (same lots as in Example #5) was fed into the first CSTR. The temperature of the 75HA750-OAc glycol and methyl hydrogen polysiloxane held in the first CSTR was 92–100° C. The agitated reaction in the first CSTR was catalyzed continuously with a 3.3% chloroplatinic acid solution in ethanol at a rate of 2.0 ml/hour that afforded a constant concentration of 10 ppm of platinum in the first CSTR. Because of the continuous hydrosilation reaction exotherm, the CSTR was maintained at a constant temperature range of 92–100° C. by the use of an external jacket on the first CSTR. The reaction mixture was pumped out of the first CSTR at the same rate at which it entered the first CSTR (approximately 2000 grams/hour) through an insulated pipeline and into a second CSTR. The temperature in the second CSTR was maintained at 91–100° C. by the use of an external heated jacket on the second CSTR. The reaction mixture left the second stirred reactor at a temperature of 91–100° C. as a homogeneous clear liquid at a rate of 2000 grams/hour and entered the plug flow reactor. The heating of the plug flow reactor was controlled so that the reaction mixture maintained a temperature of at least 92° C. The average residence time in the combined volume of the three reactors was 3.0 hours. The resulting product was cooled to <50° C. and was filtered through a 5 micron filter pad under pressure to afford a clear haze-free product of 457 cstk and cloud point of 45.5° C. No residual hydrogen siloxane was detected in the product.

Example 15 (Comparative)

In a steady state operation, 1472.2 grams/hour of 40HA1500-OAc/40HA4000-OAc glycol blend (same lot and weight ratio of materials used in Example #6) was fed into a first CSTR, and 527.8 grams/hour of equilibrated methyl hydrogen polysiloxane fluid having a nominal structure of $MD_{70}D'_5M$, and 0.03 gram/hour of tributylamine (same lots as in Example #6) was fed into the first CSTR. The temperature of the 40HA1500-OAc/40HA4000-OAc glycol blend and methyl hydrogen polysiloxane held in the first CSTR was 95–100° C. The agitated reaction in the first CSTR was catalyzed continuously with a 3.3% chloroplatinic acid solution in ethanol at a rate of 2.0 ml/hour that afforded a constant concentration of 10 ppm of platinum in the first CSTR. Because of the continuous hydrosilation reaction exotherm, the CSTR was maintained at a constant temperature range of 95–100° C. by the use of an external jacket on the first CSTR. The reaction mixture was pumped out of the first CSTR at the same rate at which it entered the first CSTR (approximately 2000 grams/hour) through an insulated pipeline and into a second CSTR. The temperature in the second CSTR was maintained at 95–100° C. by the use of an external heated jacket on the second CSTR. The reaction mixture left the second stirred reactor with a temperature of 95–100° C. as a hazy liquid at a rate of 2000 grams/hour and entered the plug flow reactor. The heating of the plug flow reactor was controlled so that the reaction mixture maintained a temperature of at least 95° C. The average residence time in the combined volume of the three reactors was 3.0 hours. The resulting product was cooled to <50° C. and was filtered through a 5 micron filter pad under pressure to afford a hazy product of 3166 cstk, and a cloud point of 35.5 C. Residual hydrogen siloxane was detected at a level of 1.1 cc $H_2$/ gram of product. This reaction did not go to full completion.

Example 16 (Comparative)

In a steady state operation, 1608.2 grams/hour of 40HA1500-OAc/40HA4000-OAc glycol blend (same lot and weight ratio of materials used in Example #7) was fed into a first CSTR, and 391.8 grams/hour of equilibrated methyl hydrogen polysiloxane fluid having a nominal structure of $MD_{65}D'_7M$, and 0.03 gram/hour of tributylamine (same lots as in Example #7) was fed into the first CSTR. The temperature of the 40HA1500-OAc/40HA4000-OAc glycol blend and methyl hydrogen polysiloxane held in the first CSTR was 95–100° C. The agitated reaction in the first CSTR was catalyzed continuously with a 3.3% chloroplatinic acid solution in ethanol at a rate of 2.0 ml/hour that afforded a constant concentration of 10 ppm of platinum in the first CSTR. Because of the continuous hydrosilation reaction exotherm, the CSTR was maintained at a constant temperature range of 95–100° C. by the use of an external jacket on the first CSTR. The reaction mixture was pumped out of the first CSTR at the same rate at which it entered the first CSTR (2000 grams/hour) through an insulated pipeline and into a second CSTR. The temperature in the second CSTR was maintained at 95–100° C. by the use of an external heated jacket on the second CSTR. The reaction mixture left the second stirred reactor with a temperature of 95–100° C. as a hazy liquid at a rate of 2000 grams/hour and entered the plug flow reactor. The heating of the plug flow reactor was controlled so that the reaction mixture maintained a temperature of at least 95° C. The average residence time in the combined volume of the three reactors was 3.0 hours. The resulting product was cooled to <50° C. and was filtered through a 5 micron filter pad under pressure to afford a hazy product of 1837 cstk, and a cloud point of 34.5° C. Residual hydrogen siloxane was detected at a level of 0.8 cc $H_2$/gram of product. This reaction did not go to full completion.

Example 17

In a steady state operation, 58.8 grams/hour of 100HA350-OMe glycol (same lot of material as in Examples #1 and #10) and 16.2 grams/hour of equilibrated methyl hydrogen polysiloxane fluid having a nominal structure of $MD'_{1.8}M$ (same lot of material as in Examples #1 and #10) were continuously fed into a static mixing plug flow reactor apparatus of the present invention. The statically-mixed reaction was catalyzed continuously with a 3.3% chloroplatinic acid solution in ethanol fed in together with the 100HA350-OMe glycol to afford a constant concentration of 10 ppm of platinum. The static mixing plug flow reactor was maintained at a constant temperature range of 95–100° C. by a constant temperature bath. The product was continuously withdrawn from the static mixing plug flow reactor as a homogeneous clear liquid at a rate of 75.0 grams/hour. The average residence time in the static mixing plug flow reactor was 2.0 hours. The resulting product was cooled to <50° C. and was filtered through a 5 micron filter pad under pressure to afford a clear haze-free product of 44.8 cstk and a cloud point of 55° C. No residual hydrogen siloxane was detected in the product.

Example 18

In a steady state operation, 61.2 grams/hour of 100LA800-OBu glycol (same lot of material as in Examples #2 and #11) and 13.8 grams/hour of equilibrated methyl hydrogen polysiloxane fluid having a nominal structure of $MD_7D'_3M$ (same lot of material as in Examples #2 and #11) were continuously fed into a static mixing plug flow reactor apparatus of the present invention. The statically-mixed reaction was catalyzed continuously with a 3.3% chloroplatinic acid solution in ethanol fed in together with the 100LA800-OBu glycol to afford a constant concentration of 7.5 ppm of platinum. The static mixing plug flow reactor was maintained at a constant temperature range of 95–100° C. by a constant temperature bath. The product was continuously withdrawn from the static mixing plug flow reactor as a homogeneous clear liquid at a rate of 75.0 grams/hour. The average residence time in the static mixing plug flow reactor was 2.0 hours. The resulting product was cooled to <50° C. and was filtered through a 5 micron filter pad under pressure to afford a clear haze-free product of 118 cstk. No residual hydrogen siloxane was detected in the product.

Example 19

In a steady state operation, 54.8 grams/hour of 40HA1500-OH/40HA4000-OH glycol blend (same lot and weight ratio of materials as in Examples #3 and #12) containing 0.01 wt. % sodium propionate and 20.2 grams/hour of equilibrated methyl hydrogen polysiloxane fluid having a nominal structure of $MD_{70}D'_5M$ (same lot of material as in Examples #3 and #12) were continuously fed into a static mixing plug flow reactor of the present invention. The statically-mixed reaction was catalyzed continuously with a 3.3% chloroplatinic acid solution in ethanol fed in together with the 40HA1500-OH/40HA4000-OH glycol blend to afford a constant concentration of 10 ppm of platinum. The static mixing plug flow reactor was maintained at a constant temperature range of 95–100° C. with a constant temperature bath. The product was continuously withdrawn from the static mixing plug flow reactor as a homogeneous clear liquid at a rate of 75.0 grams/hour. The average residence time in the static mixing plug flow reactor was 2.0 hours. The resulting product was cooled to <50° C. and was filtered through a 5 micron filter pad under pressure to afford a clear haze-free product of 4814 cstk and a cloud point of 37.8° C. No residual hydrogen siloxane was detected in the product.

Example 20

In a steady state operation, 51.0 grams/hour of 75HA750-OH glycol (same lot of material used in Examples #4 and #13) containing 0.03 wt. % 2-(dibutylamino)ethanol and 24.3 grams/hour of equilibrated methyl hydrogen polysiloxane fluid having a nominal structure of $MD_{47}D'_7M$ (same lot of material as in Examples #4 and #13) were continuously fed into a static mixing plug flow reactor apparatus of the present invention. The statically-mixed reaction was catalyzed continuously with a 3.3% chloroplatinic acid solution in ethanol fed in together with the 75HA750-OH glycol to afford a constant concentration of 10 ppm of platinum. The static mixing plug flow reactor was maintained at a constant temperature range of 95–100° C. with a constant temperature bath. The product was continuously withdrawn from the static mixing plug flow reactor as a homogeneous clear liquid at a rate of 75.3 grams/hour. The average residence time in the static mixing plug flow reactor was 2.0 hours. The resulting product was cooled to <50° C. and was filtered through a 5 micron filter pad under pressure to afford a clear haze-free product of 679 cstk and a cloud point of 57.4° C. No residual hydrogen siloxane was detected in the product.

Example 21

In a steady state operation, 51.7 grams/hour of 75HA750-OAc glycol (same lot of material as in Examples #5 and #14) containing 0.03 wt. % 2-(dibutylamino)ethanol and 23.3 grams/hour of equilibrated methyl hydrogen polysiloxane fluid having a nominal structure of $MD_{47}D'_7M$ (same lot of material as in Examples #5 and #14) were continuously fed into a static mixing plug flow reactor apparatus as described in the embodiment. The statically-mixed reaction was catalyzed continuously with a 3.3% chloroplatinic acid solution in ethanol fed in together with the 75HA750-OAc glycol to afford a constant concentration of 10 ppm of platinum. The static mixing plug flow reactor was maintained at a constant temperature range of 95–100° C. via a constant temperature bath. The product was continuously withdrawn from the static mixing plug flow reactor as a homogeneous clear liquid at a rate of 75.0 grams/hour. The average residence time in the static mixing plug flow reactor was 2.0 hours. The resulting product was cooled to <50° C. and was filtered through a 5 micron filter pad under pressure to afford a clear haze-free product of 523 cstk and a cloud point of 42° C. No residual hydrogen siloxane was detected in the product.

Example 22

In a steady state operation, 55.2 grams/hour of 40HA1500-OAc/40HA4000-OAc glycol blend (same lot and weight ratio of materials as in Examples #6 and #15) containing 0.03 wt. % tributylamine and 19.8 grams/hour of equilibrated methyl hydrogen polysiloxane fluid having a nominal structure of $MD_{70}D'_5M$ (same lot of material as in Examples #6 and #15) were continuously fed into a static mixing plug flow reactor of the present invention. The statically-mixed reaction was catalyzed continuously with a 3.3% chloroplatinic acid solution in ethanol fed in together with the 40HA1500-OAc/40HA4000-OAc glycol blend to afford a constant concentration of 10 ppm of platinum. The static mixing plug flow reactor was maintained at a constant temperature range of 100–105° C. using a constant temperature bath. The product was continuously withdrawn from the static mixing plug flow reactor as a homogeneous clear liquid at a rate of 75.0 grams/hour. The average residence time in the static mixing plug flow reactor was 2.0 hours. The resulting product was cooled to <50° C. and was filtered through a 5 micron filter pad under pressure to afford a clear haze-free product of 3071 cstk and a cloud point of 35.0° C. No residual hydrogen siloxane was detected in the product.

Example 23

In a steady state operation, 60.3 grams/hour of 40HA1500-OAc/40HA4000-OAc glycol blend (same lot and weight ratio of materials as in Examples #7 and #16) containing 0.03 wt. % tributylamine and 14.7 grams/hour of equilibrated methyl hydrogen polysiloxane fluid having a nominal structure of $MD_{65}D'_7M$ (same lot of material as in Examples #7 and #16) were continuously fed into a static mixing plug flow reactor apparatus as described in the embodiment. The statically-mixed reaction was catalyzed continuously with a 3.3% chloroplatinic acid solution in ethanol fed in together with the 40HA1500-OAc/40HA4000-OAc glycol blend to afford a constant concentration of 10 ppm of platinum. The static mixing plug flow reactor was maintained at a constant temperature range of 100–105° C. by with a constant temperature bath. The product was continuously withdrawn from the static mixing plug flow reactor as a homogeneous clear liquid at a rate of 75.0 grams/hour. The average residence time in the static mixing plug flow reactor was 2.0 hours. The resulting product was cooled to <50° C. and was filtered through a 5 micron filter pad under pressure to afford a clear haze-free product of 1857 cstk and a cloud point of 34.5° C. No residual hydrogen siloxane was detected in the product.

Example 24

In a steady state operation, 7.1 grams/hour of allyl glycidyl ether (same lot of material as in Example #8) and 142.9 grams/hour of equilibrated methyl hydrogen polysiloxane fluid having a nominal structure of $M'D_{100}M'$ (same lot of material as in Example #8) were continuously fed into a static mixing plug flow reactor apparatus of the present invention. The statically-mixed reaction was catalyzed continuously with a 3.3% chloroplatinic acid solution in ethanol fed in together with the allylglycidylether to afford a constant concentration of 5 ppm of platinum. The static mixing plug flow reactor was maintained at a constant temperature range of 90–95° C. via a constant temperature bath. The product was continuously withdrawn from the static mixing plug flow reactor as a homogeneous clear liquid at a rate of 150.0 grams/hour. The average residence time in the static mixing plug flow reactor was 1.0 hour. The resulting product was cooled to <50° C. and was filtered through a 5 micron filter pad under pressure to afford a clear haze-free product of 106 cstk. No residual hydrogen siloxane was detected in the product.

Example 25

In a steady state operation, 53.6 grams/hour of 1-octene (same lot of material as in Example #9) and 96.4 grams/hour of equilibrated methyl hydrogen polysiloxane fluid having a nominal structure of MD'M (same lot of material as in Example #9) were continuously fed into a static mixing plug flow reactor apparatus as described in the embodiment. The statically-mixed reaction was catalyzed continuously with a 3.3% chloroplatinic acid solution in ethanol fed in together with the 1-octene to afford a constant concentration of 6 ppm of platinum. The static mixing plug flow reactor was maintained at a constant temperature range of 80–85° C. with a constant temperature bath. The product was continuously withdrawn from the static mixing plug flow reactor as a homogeneous clear liquid at a rate of 150.0 grams/hour. The average residence time in the static mixing plug flow reactor was 1.0 hour. The resulting product was cooled to <50° C. and was filtered through a 5 micron filter pad under pressure to afford a clear haze-free product of 2.72 cstk. No residual hydrogen siloxane was detected in the product.

TABLE I

| Example # | Method of Preparation | Final SiH level cc $H_2$/gram | Appearance | Viscosity (catk) | Cloud Point (° C.) | Application | Foam Results Rise | T/C | A/F | Cell Struct | Flow index | Relative flow index |
|---|---|---|---|---|---|---|---|---|---|---|---|---|
| 1 | Batch | ND | clear | 50 | 55 | agricultural | | | | N/A | | |
| 10 | CSTR-CCU | ND | clear | 49.9 | 55 | agricultural | | | | N/A | | |
| 17 | Static Mixing | ND | clear | 44.8 | 55 | agricultural | | | | N/A | | |
| 2 | Batch | ND | clear | 139 | N/A | coatings | | | | N/A | | |
| 11 | CSTR-CCU | ND | clear | 129 | N/A | coatings | | | | N/A | | |
| 18 | Static Mixing | ND | clear | 118 | N/A | coatings | | | | N/A | | |
| 3 | Batch | ND | clear | 4132 | 36.8 | flexible foam | 41.6 | 0.1 | 1.5 | 6 | | N/A |
| 12 | CSTR-CCU | 0.4 | hazy | 4281 | 37.5 | flexible foam | 41.6 | 0.1 | 0.6 | 7 | | N/A |
| 19 | Static Mixing | ND | clear | 4814 | 37.8 | flexible foam | 40 | 0 | 0.9 | 7 | | N/A |
| 4 | Batch | ND | clear | 683 | 54.8 | rigid foam | | N/A | | | 0.642 | −2.3 |
| 13 | CSTR-CCU | 0.1 | clear | 741 | 59.6 | rigid foam | | N/A | | | 0.683 | +4.0 |
| 20 | Static Mixing | ND | clear | 679 | 57.4 | rigid foam | | N/A | | | 0.682 | +3.8 |
| 5 | Batch | ND | clear | 461 | 41.5 | rigid foam | | N/A | | | 0.665 | +4.4 |
| 14 | CSTR-CCU | ND | clear | 457 | 45.5 | rigid foam | | N/A | | | 0.670 | +5.2 |
| 21 | Static Mixing | ND | clear | 523 | 42 | rigid foam | | N/A | | | 0.684 | +7.0 |
| 6 | Batch | ND | clear | 3807 | 34 | flexible foam | 39.4 | 1.8 | 4.7 | 7 | | N/A |

TABLE I-continued

| Example # | Method of Preparation | Final SiH level cc H$_2$/gram | Appearance | Viscosity (catk) | Cloud Point (° C.) | Application | Foam Results Rise | T/C | A/F | Cell Struct | Flow index | Relative flow index |
|---|---|---|---|---|---|---|---|---|---|---|---|---|
| 15 | CSTR-CCU | 1.1 | hazy | 3166 | 35.5 | flexible foam | Foam Collapsed | | | | | N/A |
| 22 | Static Mixing | ND | clear | 3071 | 35 | flexible foam | 36.5 | 3.4 | 7.5 | 8 | | N/A |
| 7 | Batch | ND | clear | 2144 | 34 | flexible foam | 38.6 | 2 | 1.6 | 7 | | N/A |
| 16 | CSTR-CCU | 0.8 | hazy | 1837 | 34.5 | flexible foam | 35.8 | 3.2 | 9.6 | 11 | | N/A |
| 23 | Static Mixing | ND | clear | 1857 | 34.5 | flexible foam | 35.1 | 3.7 | 4.4 | 7 | | N/A |
| 8 | Batch | ND | clear | 111 | N/A | personal care | | | | N/A | | |
| 24 | Static Mixing | ND | clear | 106 | N/A | personal care | | | | N/A | | |
| 9 | Batch | ND | clear | 2.39 | N/A | agricultural | | | | N/A | | |
| 25 | Static Mixing | ND | clear | 2.72 | N/A | agricultural | | | | N/A | | |

*ND = Non-detectable

Table I provides a comparison of silicone copolymers characteristics made from prior art methods and from the continuous process of the present invention utilizing the static mixing plug flow reactor.

The silicone copolymer material prepared in Example 1 (batch), Example 10 (CSTR), and Example 17 (static mixing plug flow reactor) is used in agricultural applications. For all three methods of preparation, complete hydrosilation reaction was observed, and the resulting materials had similar characteristics as reflected by the clear appearance, viscosity and cloud point.

The silicone copolymer material prepared in Example 2 (batch), Example 11 (CSTR), and Example 18 (static mixing plug flow reactor) is used in surface leveling paint and coatings applications. For all three methods of preparation, complete hydrosilation reaction was observed, and the resulting materials had similar characteristics as reflected by the clear appearance and viscosity.

The silicone copolymer material prepared in Example 3 (batch), Example 12 (CSTR), and Example 19 (static mixing plug flow reactor) is used in surface leveling paint and coatings applications and in flexible polyurethane foam formulations. Complete hydrosilation was observed for the batch as well as the static mixing plug flow reactor methods of preparation. The final materials produced by the batch method and the static mixing plug flow reactor method had a clear appearance and similar cloud point values as well as foam performance. For the CSTR method of preparation the hydrosilation reaction did not go to completion, with residual hydrogen siloxane detected at a level of 0.4 cc H$_2$/gram of product, and the final material afforded a hazy unacceptable appearance. The material produced by the CSTR method had similar cloud point characteristics and foam performance as the materials produced by the other two methods of preparation (batch and static mixing plug flow reactor).

The silicone copolymer material prepared in Example 4 (batch), Example 13 (CSTR), and Example 20 (static mixing plug flow reactor) is used in rigid polyurethane foam formulations. For all three methods of preparation, complete hydrosilation reaction was observed, and the resulting materials had similar characteristics as reflected by the clear appearance, viscosity, cloud point and foam performance.

The silicone copolymer material prepared in Example 5 (batch), Example 14 (CSTR), and Example 21 (static mixing plug flow reactor) is used in rigid polyurethane foam formulations. For all three methods of preparation, complete hydrosilation reaction was observed, and the resulting materials had similar characteristics as reflected by the clear appearance, viscosity, cloud point and foam performance.

The silicone copolymer material prepared in Example 6 (batch), Example 15 (CSTR) and Example 22 (static mixing plug flow reactor) is used in flexible polyurethane foam formulations. Complete hydrosilation was observed for the batch as well as the static mixing plug flow reactor methods of preparation. The final materials produced by these two methods had a clear appearance and similar cloud point values as well as foam performance. For the CSTR method of preparation, however, the hydrosilation reaction did not go to full completion, with residual hydrogen siloxane detected at a level of 1.1 cc H$_2$/ gram of product, and the final material afforded a hazy unacceptable appearance. The material produced by the CSTR method was incapable of performing as an acceptable surfactant, resulting in totally collapsed foam when tested.

The silicone copolymer material prepared in Example 7 (batch), Example 16 (CSTR), and Example 23 (static mixing plug flow reactor) is used in flexible polyurethane foam formulations. Complete hydrosilation was observed for the batch method as well as the static mixing plug flow reactor method of preparation. The final materials produced by these two methods had a clear appearance and similar cloud point values as well as foam performance. For the CSTR method of preparation, however, again the hydrosilation reaction did not go to full completion, with residual hydrogen siloxane detected at a level of 0.8 cc H$_2$/gram of product, and the final material afforded a hazy unacceptable appearance. The material produced by the CSTR method had foam stabilizing properties, but produced unacceptable foam with high porosity and large non-uniform coarse cell structure.

The silicone copolymer material prepared in Example 8 (batch) and Example 24 (static mixing plug flow reactor) is used in preparing personal care products. For both methods of preparation, complete hydrosilation reaction was observed, and the resulting materials had similar characteristics as reflected by the clear appearance and viscosity.

The silicone copolymer material prepared in Example 9 (batch) and Example 25 (static mixing plug flow reactor) is used in agricultural applications. For both methods of preparation, complete hydrosilation reaction was observed, and the resulting materials had similar characteristics as reflected by the clear appearance and viscosity.

The present invention achieves the objectives discussed above by providing an efficient method of manufacturing silicone copolymers without the drawbacks of prior art methods. The method of the present invention produces a silicone copolymer substantially free of unreacted hydrogen siloxane and may be used directly from the reactor without further purification. Sufficient agitation is provided for in the reaction apparatus of the present invention that the hydrogen siloxane and olefinic reactant does not undergo phase separation during hydrosilation. Additional hydrogen siloxane and olefinic reactants may be added during the process to provide custom designed silicone copolymers with ease. The present invention provides for an economic and efficient way of producing silicone copolymers on a commercial scale without the need for the storage of crude product. The process may be performed in a batch wise fashion or continuously.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method of making silicone copolymers comprising the steps of:

providing one or more static mixing plug flow reactors;

continuously feeding reactants to said one or more static mixing plug flow reactors, the reactants comprising hydrogen siloxane, at least one olefinic reactant capable of reacting with the hydrogen siloxane, and catalyst; and continuously withdrawing from a terminal end of said one or more static mixing plug flow reactors a product stream substantially free of unreacted hydrogen siloxane.

2. The method of claim 1 wherein the step of providing one or more static mixing plug flow reactors comprises providing one or more static mixing plug flow reactors having a mixing element wherein the mixing element creates turbulent flow of sufficient intensity that the reactants undergo shearing of droplets sufficient to disperse one phase into another such that phase separation of the reactants does not occur.

3. The method of claim 2 wherein the step of providing one or more static mixing plug flow reactors comprises providing one or more static mixing plug flow reactors having a mixing element wherein the mixing element creates eddies and vortices of sufficient intensity that the reactants undergo shearing of droplets sufficient to disperse one phase into another such that phase separation of the reactants does not occur more rapidly than 2 to 3 half-lives of a hydrosilation reaction.

4. The method of claim 1 wherein more than one static mixing plug flow reactors are provided.

5. The method of claim 4 wherein two static mixing plug flow reactors are provided in series.

6. The method of claim 4 wherein two static mixing plug flow reactors are provided in parallel.

7. The method of claim 1 wherein during the step of continuously feeding the reactants into said one or more static mixing plug flow reactors, the olefinic reactant has dissolved therein a buffering agent to prevent unwanted side reactions.

8. The method of claim 1 wherein upon feeding the reactants into said one or more static mixing plug flow reactors, the reactants remain in said one or more static mixing plug flow reactors for a finite period of time at a sufficient temperature such that substantially complete hydrosilation is effectuated.

9. The method of claim 1 further including the step of feeding into said one or more static mixing plug flow reactors an effective amount of solvent such that the reactants are miscible.

10. The method of claim 9 further including the step of removing the solvent.

11. The method of claim 1 further including the step of adding an additional reactant comprising another hydrogen siloxane capable of reacting with an olefinic reactant or another olefinic reactant capable of reacting with hydrogen siloxane.

* * * * *